(12) United States Patent
Andrews et al.

(10) Patent No.: US 10,052,832 B2
(45) Date of Patent: Aug. 21, 2018

(54) METHOD OF MANUFACTURING A WHEEL WITH A TYRE AND A WHEEL WITH A TYRE

(71) Applicant: CAPAK LTD, Cheshire (GB)

(72) Inventors: Michael Andrews, Tarporley (GB); Paul Andrews, Whitchurch (GB)

(73) Assignee: CAPAK LTD, Tarporley, Cheshire (GB)

( * ) Notice: Subject to any disclaimer, the term of this patent is extended or adjusted under 35 U.S.C. 154(b) by 33 days.

(21) Appl. No.: 15/021,586

(22) PCT Filed: Sep. 12, 2014

(86) PCT No.: PCT/GB2014/052770
§ 371 (c)(1),
(2) Date: Mar. 11, 2016

(87) PCT Pub. No.: WO2015/036775
PCT Pub. Date: Mar. 19, 2015

(65) Prior Publication Data
US 2016/0221284 A1 Aug. 4, 2016

(30) Foreign Application Priority Data

Sep. 13, 2013 (GB) .................................. 1316332.4

(51) Int. Cl.
*B29D 30/02* (2006.01)
*B60C 7/14* (2006.01)
(Continued)

(52) U.S. Cl.
CPC ................ *B29D 30/02* (2013.01); *B60B 5/02* (2013.01); *B60C 7/14* (2013.01); *B60C 7/24* (2013.01);
(Continued)

(58) Field of Classification Search
CPC .... B60C 7/00; B60C 7/14; B60C 7/24; B60C 15/0233; B60B 5/02; B60B 7/06;
(Continued)

(56) References Cited

U.S. PATENT DOCUMENTS 3,952,786 A * 4/1976 Kreling ..................... B60B 5/02
152/310
4,095,846 A * 6/1978 Agins ....................... B60B 5/02
152/323

(Continued)

FOREIGN PATENT DOCUMENTS

EP          0007989       2/1980
GB          879710 A      10/1961
(Continued)

OTHER PUBLICATIONS

International Search Report and Written Opinion for PCT/GB2014/052770.

*Primary Examiner* — Kip T Kotter
(74) *Attorney, Agent, or Firm* — Gavin J. Milczarek-Desai; Quarles & Brady LLP

(57) ABSTRACT

Methods of forming a tire 4 directly on a wheel in which the wheel has a conduit which runs between its hub and rim. A mold is placed over the wheel in order to form a cavity between an inner surface of the mold and the wheel's rim. Liquid materials to form the tire 4 are injected into the cavity via the conduit and the wheel spun to distribute the materials throughout the cavity, which materials solidify to form the tire 4 attached to the wheel. The method includes the step of placing a hub cap 6 over a face of the wheel prior to placing the mold and sealing the hub cap 6 to the wheel during the molding process. The tire 4 may have a substantially hollow interior 50 which may include a flexible web 18 sealed within the rim of the wheel by the hub cap 6.

20 Claims, 5 Drawing Sheets

(51) Int. Cl.
*B60C 7/24* (2006.01)
*B60B 5/02* (2006.01)
*B29C 45/14* (2006.01)
*B29C 45/00* (2006.01)
*B29K 75/00* (2006.01)
*B29K 105/00* (2006.01)
*B60C 1/00* (2006.01)

(52) U.S. Cl.
CPC ...... *B29C 45/0046* (2013.01); *B29C 45/1459* (2013.01); *B29K 2075/00* (2013.01); *B29K 2105/0058* (2013.01); *B60C 2001/0091* (2013.01); *B60C 2007/146* (2013.01)

(58) Field of Classification Search
CPC ........ B60B 7/061; B60B 7/063; B60B 7/065; B60B 7/066; B29D 30/02; B29D 30/06; B29D 30/0678; B29C 45/0046; B29C 45/1459
USPC ......... 152/9, 380; 264/275, 273, 267, 328.9, 264/328.12
See application file for complete search history.

(56) References Cited

U.S. PATENT DOCUMENTS

| | | | | |
|---|---|---|---|---|
| 4,253,510 A * | 3/1981 | De Lorean | ................ | B60B 7/00 152/380 |
| 4,387,070 A * | 6/1983 | Cunard | ............... | B29C 45/1676 264/247 |
| 4,449,756 A * | 5/1984 | Weeks | ................. | B60B 7/0006 301/37.42 |
| 4,588,542 A * | 5/1986 | Pierce | ................. | B29C 44/0407 152/323 |
| 5,128,085 A * | 7/1992 | Post | .......................... | B60B 7/00 264/254 |
| 5,133,591 A * | 7/1992 | Skaggs | ................... | B29C 33/14 301/64.702 |
| 5,743,316 A * | 4/1998 | Chrobak | ................... | B60B 9/04 152/11 |
| 6,755,265 B2 * | 6/2004 | Huntsberger | ....... | B60L 11/1805 152/246 |
| 8,037,911 B2 * | 10/2011 | Morris | ................ | B29C 45/1657 152/323 |
| 8,689,845 B2 * | 4/2014 | Morris | ................ | B29C 45/1657 152/323 |
| 8,968,619 B2 * | 3/2015 | Andrews | ............ | B29D 30/0678 264/267 |
| 2012/0038206 A1 * | 2/2012 | Chadwick | ................. | B60C 7/18 301/37.23 |
| 2013/0221731 A1 * | 8/2013 | Hess | ......................... | B60B 5/02 301/37.101 |
| 2015/0136290 A1 * | 5/2015 | Kim | ....................... | B29D 30/02 152/246 |

FOREIGN PATENT DOCUMENTS

| | | | | |
|---|---|---|---|---|
| JP | 08309780 A * | 11/1996 | ......... | B29C 45/1704 |
| WO | 2004058369 A1 | 7/2004 | | |
| WO | 2010140004 A2 | 12/2010 | | |

* cited by examiner

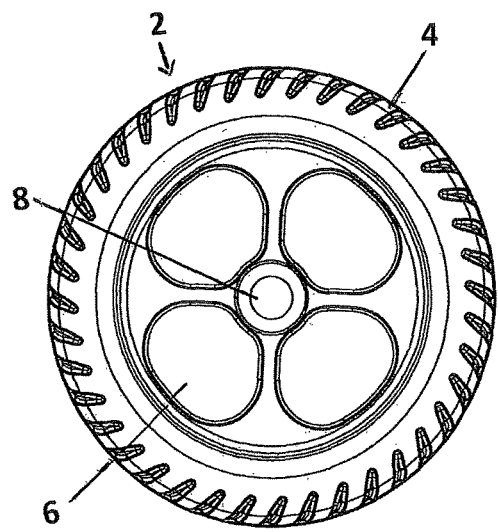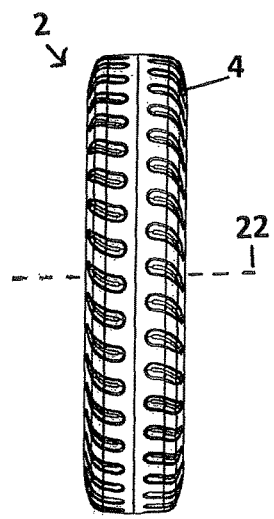
Fig. 1    Fig. 2
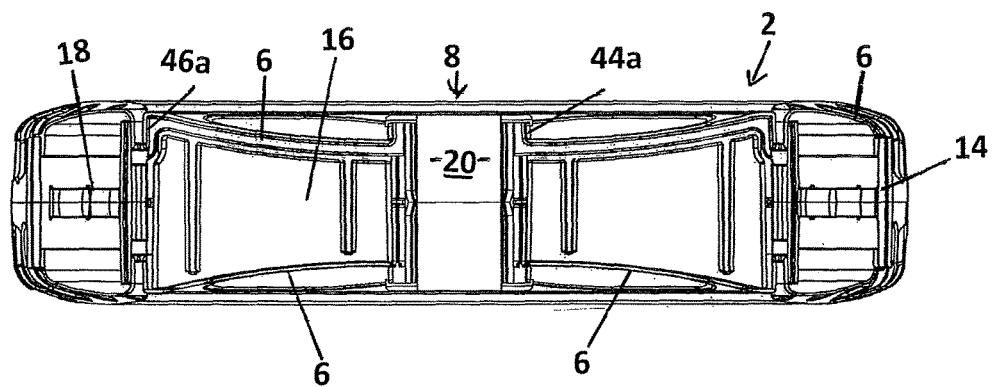
Fig. 3

METHOD OF MANUFACTURING A WHEEL WITH A TYRE AND A WHEEL WITH A TYRE

The present invention relates to a method of manufacturing a wheel with a tyre.

The present invention also relates to a wheel with a tyre.

In current wheel production, a wheel and tyre are each manufactured separately and the tyre is subsequently mounted onto the wheel. Since the wheel and tyre are manufactured separately, the costs of manufacture, storage, transport and assembly of wheels manufactured in this way are high.

With current wheels, a rim of the wheel is provided with opposed flanges, either side thereof, which protrude in a radial direction. An inner well region is defined by the flanges and the rim. The inner well region enables a tyre to be fitted to the wheel.

When solid or 'puncture proof' tyres, such as of foamed polyurethane, are used, they currently have to fit such existing wheel designs. This is disadvantageous in that the tyre must fill the inner well region. This uses an unnecessarily high amount of tyre material, which leads to inefficient and consequently expensive production.

It is known, in the manufacture of polyurethane tyres, to inject polyurethane into a mould, where it then forms into a tyre. The mould is spun, during injection of the polyurethane, in order to encourage the tyre to form correctly within the mold. However, a problem with this method is that excess foamed polyurethane material forms in the centre of the tyre as it undergoes a foaming reaction. The centrifugal force produced by spinning the mold is insufficient to prevent this. Accordingly, it is necessary to trim the excess foamed polyurethane material from the centre of the tyres.

WO 2010/140004 describes a method of manufacture of a wheel with a solid tyre, in which the tyre is formed directly on the wheel and by this means overcomes the disadvantages of the separate wheel and tyre production described above. In this prior method the wheel has a conduit running between its hub and rim. A mould is placed over the wheel in order to form a cavity between an inner surface of the mould and the wheel's rim. Liquid materials to form the tyre are injected into the cavity via the conduit and the wheel spun to distribute the materials throughout the cavity, which materials solidify to form a solid tyre attached to the wheel. This has the advantage that since the tyre and wheel are not produced separately, a saving is made in inventory, assembly costs and transport. This method is particularly suited to the production of a solid tyre for light industrial carts and trailers, and is particularly suitable for use on a wheelbarrow.

The main support structure of the wheel is injection moulded from a polyolefin and the tyre from a foamed polyurethane. The body of the tyre compresses as it passes over the ground to provide cushioning and shock-absorption. One of the main disadvantages of the solid tyre construction is that it uses a large amount of a relatively expensive material, foamed polyurethane. It also is less deformable upon ground contact when compared to, for example, a hollow tyre and therefore provides less shock-absorbing capabilities.

It is therefore an object of the present invention to provide a method of manufacturing a wheel with a tyre which overcomes or alleviates the above described drawbacks.

By way of example only specific embodiments of the invention will now be described with reference to the accompanying drawings, in which:

In accordance with a first aspect of the present invention there is provided a method of manufacturing a wheel and a tyre comprising the steps of providing a wheel and moulding a tyre to the wheel, placing a mould over the wheel such that a cavity is formed between an inner surface of the mould and a rim of the wheel, for receiving material to form the tyre, wherein the wheel is provided with an inlet which is fluidly connected by a conduit to an outlet in the rim of the wheel, and a material to form the tyre is injected into the inlet, and wherein a hub cap is provided and the method includes the additional steps of covering a face of the wheel with the hub cap prior to the step of placing the mould, and sealing the hub cap to the wheel during the moulding process.

A hub cap may be placed on each face of the wheel prior to the step of moulding and the hub cap may extend to at least partially cover the rim.

The or each hub cap may have a plurality of apertures and the method includes the step of aligning the apertures with the outlet to fluidly connect the apertures with the outlet.

The rim may have an open channel and the outlet opens into the channel, the step of placing the hub cap including the step of covering the channel with the hub cap whilst aligning the apertures of the hub cap with the channel.

A second open channel may be provided in the rim which is fluidly connected to the first channel.

The channels may open to opposite faces of the wheel.

The rim may include two spaced concentric bands interconnected by a web between the bands, which band extend around the circumference of the wheel, wherein the or each of the channels may be provided in at least one of the bands, the step of placing the hub cap including sealing the web between the bands with the hub cap.

In a preferred embodiment the channel is in the innermost band and the method includes the step of introducing material to form the tyre into the inlet, flowing the material through the conduit into the channel, flowing the material through the apertures into the mould's cavity and allowing the tyre to form in the cavity.

In one embodiment the second channel is in the innermost band and the method further includes the step of flowing material from the first channel to the second channel and flowing the materials through the hub cap apertures into the cavity.

The cavity may define the shape of the tyre to be moulded.

The material to form the tyre may be introduced into the mould in a liquid form and allowed to solidify in the mould to form a tyre attached to the wheel, the liquid may also solidify in the conduits, channels and apertures to increase the anchorage of the tyre to the wheel.

The mould may be placed over the wheel, it extends substantially around the circumference of the wheel.

The wheel may comprise a hub and the inlet is located at the hub.

The inlet is provided at a point substantially in the centre of the wheel.

The wheel may be provided with a plurality of said inlets and outlets.

The outlets may be distributed around the rim of the wheel. Each inlet may be fluidly connected by a respective conduit to a respective outlet, the conduit may be open and the step of placing the hub cap includes the step of sealing the conduits with the hub cap.

A pipe 15 may be fluidly connected to the inlet and the material to form the tyre is injected into the or each inlet through the pipe 15, the method includes the step of rotating the wheel during the injection process.

Accordance with a second aspect of the present invention there is provided a wheel with tyre which has been manufactured according to any one of the preceding statements, comprising a wheel with a rim and opposite faces, a tyre moulded about the rim, and a hub cap sealed to a face of the wheel by the moulded tyre, wherein the tyre has a substantially hollow interior.

The hollow interior may comprise a flexible web.

The web may comprise two concentric, spaced bands extending around the wheel with the web extending between the bands.

The hub cap may seal the web completely between the bands.

A hub cap may be sealed on each face of the wheel.

The wheel may have a hub, and the hub cap has a hub cap aperture and means to seal about the hub.

By way of example only specific embodiments of the invention will now be described with reference to the accompanying drawings, in which:—

FIG. 1 is a front view of a wheel with tyre constructed in accordance with the present invention;

FIG. 2 is a side view of the wheel with tyre of FIG. 1;

FIG. 3 is a cross-sectional view through the wheel with tyre of FIG. 1;

Figure 5:
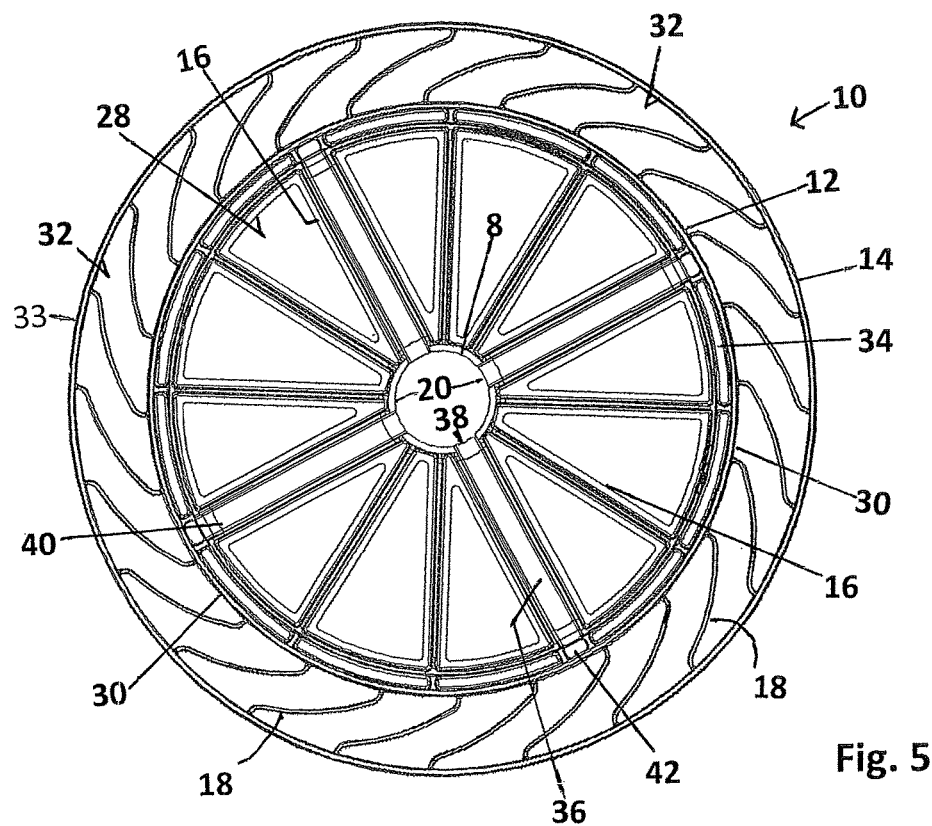
Figure 6:
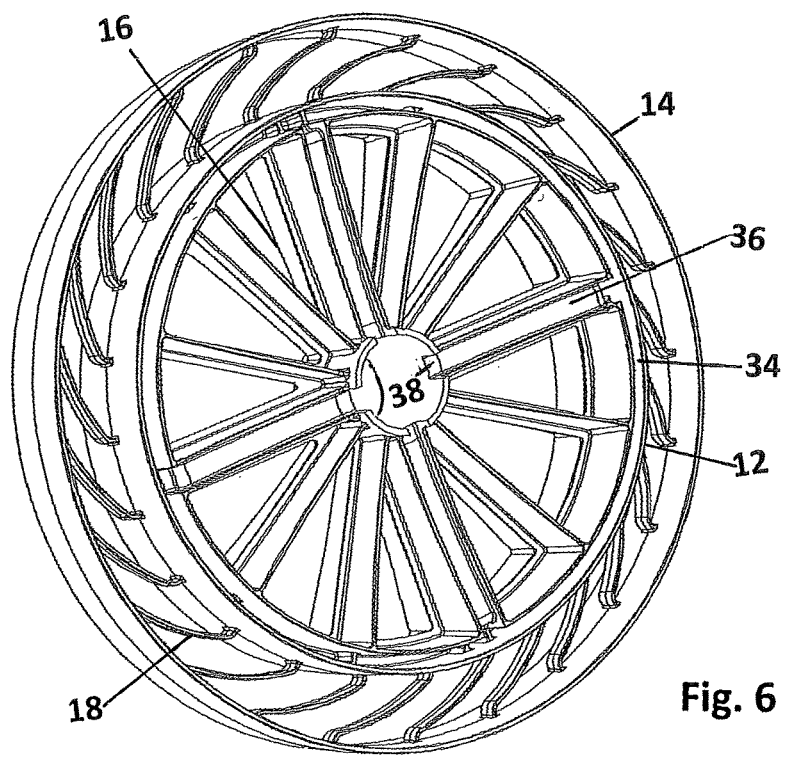
Figure 7:
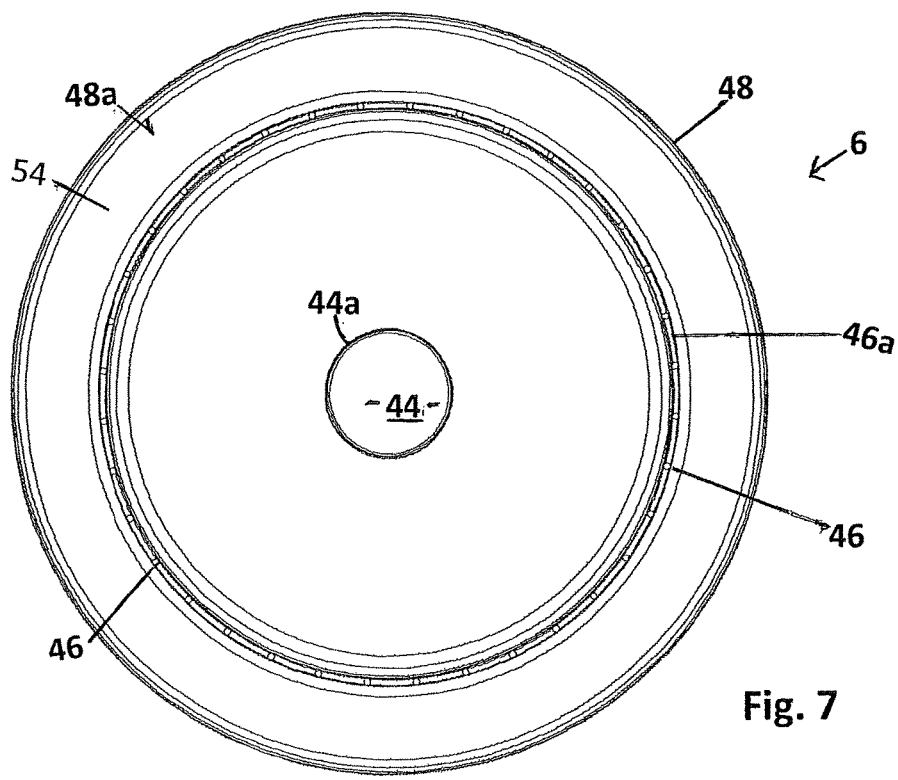
Figure 8:
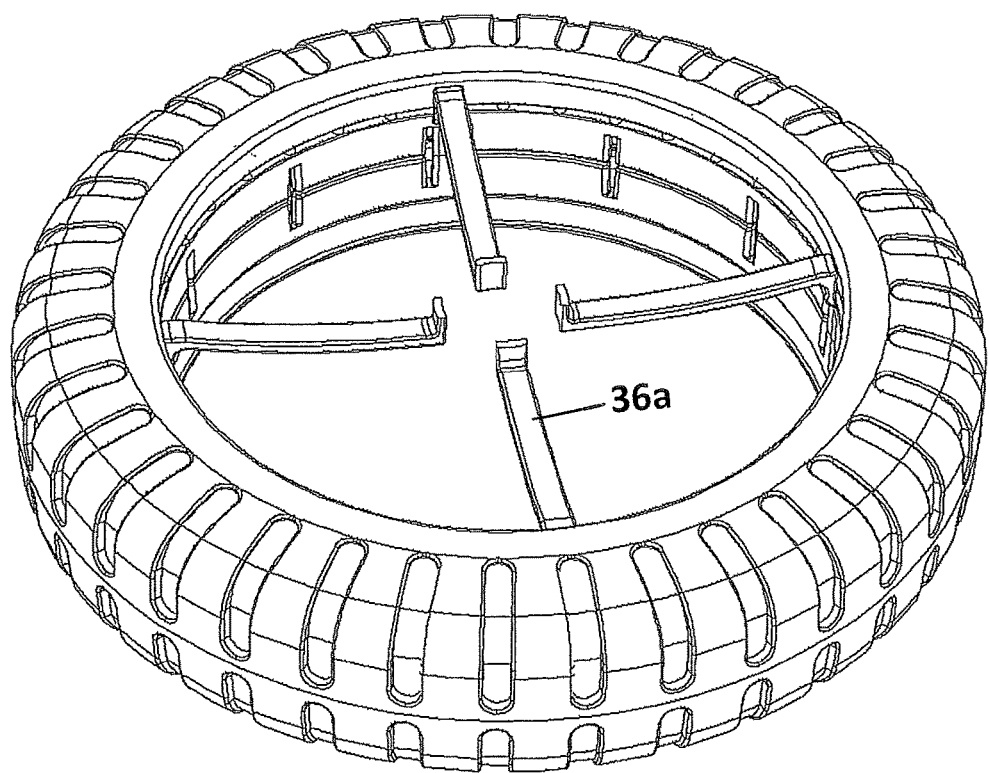

FIGS. 5 to 8 are each components of an exploded view of the wheel with tyre of FIG. 1 in which FIG. 5 is a front view of the wheel; FIG. 6 is a perspective view of the wheel; FIG. 7 is a front view of a hub cap; and FIG. 8 is a perspective front view of the tyre.

Figure 9:
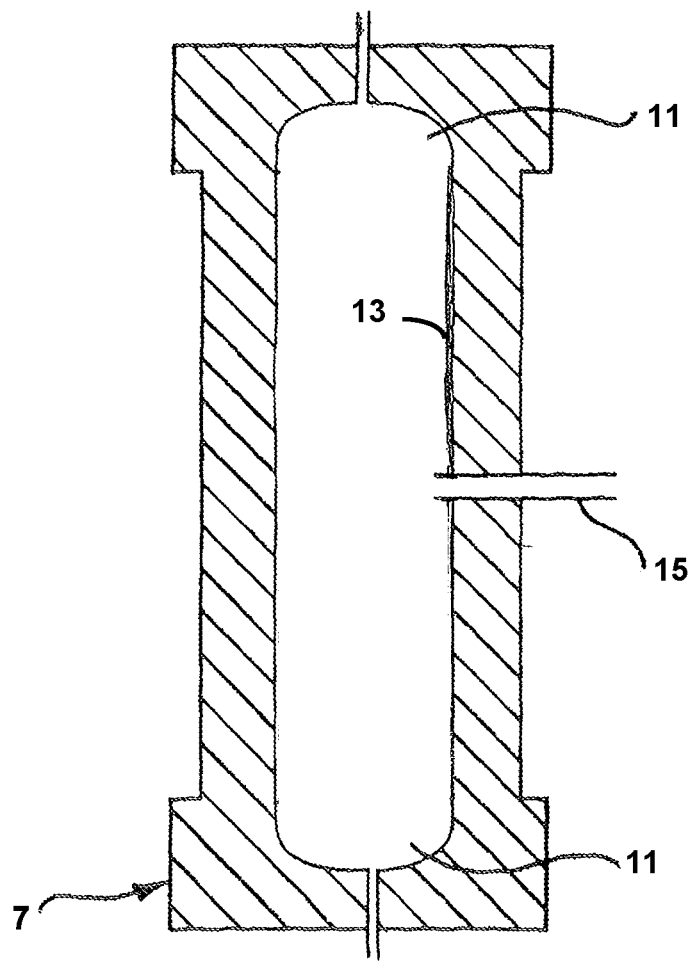

FIG. 9 depicts in cross-section a mould embodiment, as well as a cavity provided by the mould and a pipe through which material flows into the mould.

Referring now to the figures, FIGS. 1 and 2 show a circular wheel with tyre 2 constructed in accordance with one embodiment of the invention. The wheel with tyre 2 comprises a continuous annular tyre portion 4 about its rim, a hub cap 6 substantially covering a front face of the wheel, (a second hub cap is provided on the opposite face of the wheel, not illustrated), and an internal wheel support structure only the central hub 8 of which is visible in FIG. 1; the rest of the structure is completed encapsulated by the tyre and hub caps. In use the hub 8 provides a connection for an axle of a vehicle, such as a wheelbarrow.

As best illustrated in FIGS. 5 and 6, the internal wheel support structure 10 comprises a structure which is injection moulded from a polyolefin.

The support structure 10 comprises the central hub 8, a rim in the form of two annular bands 12, 14 and supporting spokes 16 and webs 18.

The central hub 8 is annular; its internal passage 20 extends through the centre of the wheel 10 to provide a central axis 22, about which the wheel 10 rotates. The central passage 20 extends in a direction perpendicular to the diameter of the wheel 10, terminating at apertures provided in opposed faces of the wheel, forming first and second ends 24, 26 of the hub 8.

The first of the annular bands 12 is provided about the exterior of the hub 8, and is concentric thereto about the central axis 22. The first annular band 12 has an internal peripheral edge 28 which faces the hub 8, and an outer peripheral side 30, which faces the second annular band 14. A series of spokes 16 each extend radially outwards from the hub 8 to points distributed around the internal periphery 28 of the first band 12 to connect the first band 12 to the hub 8. The spokes 16 provide strength and rigidity to the wheel.

The second of the annular bands 14 is provided about the outer peripheral side 30 of the first annular band 12, and is concentric thereto. The second annular band 14 has an internal peripheral side 32 which faces the first band 12, and an exterior peripheral side 33 on the outer edge or rim of the wheel structure. A series of webs 18 each extend outwards from the outer peripheral side 30 of the first annular band 12 to points distributed around the internal peripheral side 32 of the second band 14 to connect the second band 14 to the first band 12, and thereby to the hub 8. The webs 18 are each inclined with respect to the radially extending spokes (this will be described further below).

The first annular band 12 has a substantially H-shaped profile to provide two channels 34 in the form of circular grooves which extend around opposite faces of the first band 12. Each channel 34 has a base sunk into its face of the band 12, which face extends between the internal and external periphery sides 28, 30 of the first band 12. Each channel 34 is open to its respective face of the band 12, which is also the respective front face and opposite face of the wheel 10.

A conduit 36 is provided in a spoke 16. In a similar manner to the channel 34, the conduit 36 is open to the face side of the wheel. The conduit 36 has an inlet 38 and an outlet 40. The inlet 38 is provided through the hub 8, such that the conduit 36 opens into the hub 8. The outlet 40 is provided in the internal peripheral edge 28 of the band 12, to connect the conduit 36 to the channel 34. In this embodiment there are four such conduits 36 spaced equally apart, radially about the hub 8. However, it is to be understood that any number of such conduits could be provided.

Four bores 42 are provided through the base of the channel 34 to provide a passage between the two channels 34. Each bore 42 lies adjacent a respective outlet 40 to a conduit 36.

As best illustrated in FIG. 7 each hub cap 6 has a circular disc like shape, with a central hole 44 adapted to receive the hub 8 therethrough, and an outer peripheral edge 48. Each hub cap 6 has a ring of spaced, small apertures 46 provided concentric to the central hole 44 and which are located between the central hole 44 and the outer peripheral edge 48 of the hub cap 6.

Figure 4:
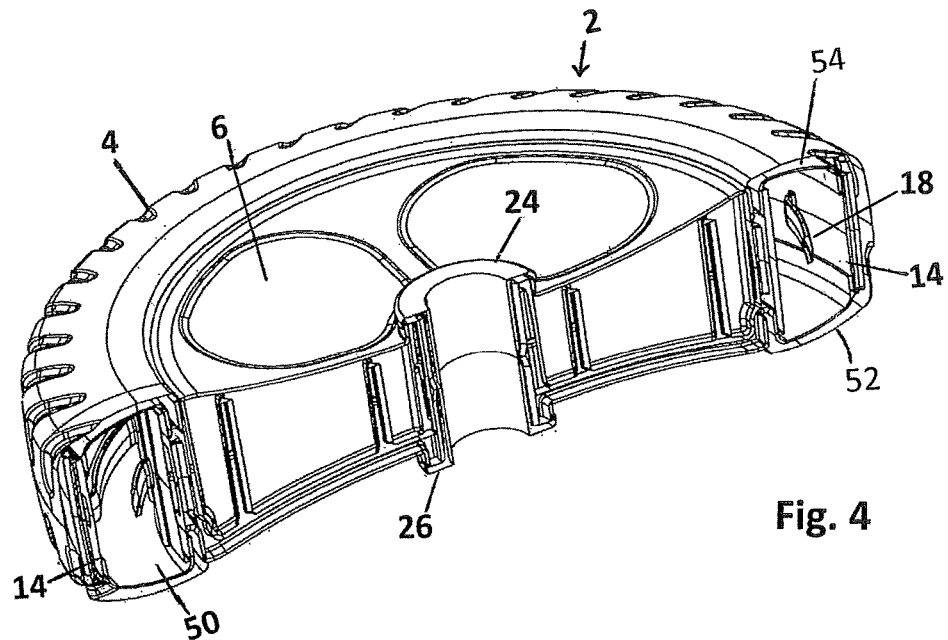
FIG. 4 is a view similar to that of FIG. 3 but shown in perspective.

The hub cap 6 is formed of a flexible material, such as polypropylene. The hub cap 6 also has several ring like connections which enable a press-fit connection to the wheel structure 10, these are best illustrated in FIGS. 3, 4 and FIG. 7.

The ring of small apertures 46 are provided in a ring-like depression in the hub cap 6, which depression when fitted to the wheel structure 10 makes a press-fit connection into channel 34.

The peripheral outer edge 48 of the hub cap 6, has a circular lip 48a which provides a press-fit connection to the second band 14.

The interior opening 44 of the hub cap 6 is also provided with a lip 44a which seals around the end of the hub 8.

When the hub cap 6 is mounted to the hub 8, the ring of spaced apertures 46 align with the open channel 34 in the first band 12, and is held in place by the depression 46a press-fitted into the channel 34. The spokes 16 and webs 18 are encapsulated by the connection of the lips 48a and 20a to the band 14 and hub 8 respectively.

In order to form the tyre on the wheel 10, a hub cap 6 is mounted to each face of the wheel structure 10. The body of the hub cap 6 on the front face covers the open conduits 36 in the front face of the spokes 16 to provide an enclosed conduit with an inlet 38 and outlet 40 as described above, whilst the circular ring of apertures 46 on a respective hub cap 6 align with a respective open channel 34 of the first band 12 whilst substantially closing each open channel 34; leaving only the series of equally spaced apertures 46 to provide outlets to each channel 34. The body of each hub cap 6 covers and encloses the spokes 16 and webs 18 and extends from the hub 8 to the second band 14 on respective faces of the wheel 10.

Turing to FIG. 9 a mould 7 is then placed over the wheel 10.(not shown for ease of illustration, but see FIGS. 5 and 7 for the corresponding wheel, as well as the bands, hub cap, hub cap apertures, webs and spokes referenced below.) The mould 7 extends around the rim of the wheel providing a cavity 11 between an inner surface 13 of the mould and the encapsulated wheel 10. The cavity 11 defines the shape of the tyre to be moulded, i.e., defines the 'negative' of the desired shape. The cavity 11 extends around the first and second bands 12, 14 spanning around the rim including the hub cap apertures 46 therewithin. The mould 7 clamps the hub cap 6 to the wheel, sealing the webs 18 and spokes 16 thereunder.

A feed (not illustrated) is connected to the hub 8, a nozzle of which is connected by a sealed running fit to one end of the hub 8, a pin (also not illustrated) is provided in the other end of the hub, to close that end of the hub. Two liquid chemicals, suitable for forming polyurethane, are injected through the nozzle and into the interior of the hub 20. The liquid chemicals pass through the hub 8 into each of the inlets 38 and then into the conduits 36.

The feed is connected to the hub 8 at the centre 20 of the wheel 10. This allows the wheel 10 to be rotated during the mould process, without the feed becoming tangled, as it will not describe a circle as the wheel rotates.

The liquid chemicals move through the conduits 36 into the channel 34 where they flow around and fill the channel 34. The liquid chemicals also pass through the bores 42 to the channel 34 on the opposite face of the wheel 10, where the liquid chemicals flow round and fill the opposite channel 34. Once the channels 34 have filled, the pressure of the incoming liquid chemicals forces the mixture through the apertures 46 provided in each hub cap 6, into the mould's cavity.

The liquid chemicals are mixed together, react together and then cured in the cavity to form a polyurethane tyre.

Air outlets (not illustrated) are provided in the cavity, to allow the air to escape from the cavity, as it is filled with liquid chemicals.

The mould and wheel are rotatable. As the liquid chemicals are injected into the wheel 10, the mould and the wheel 10 are spun, about the wheel's central axis 22. This acts to encourage the liquid chemicals to flow through the conduits 36, channels 34, and apertures 46 into the mould cavity.

As the tyre 4 is moulded to the wheel 10 to form the wheel with tyre 2, the solidifying polyurethane seals the passageways 34, 36 and various orifices 38, 40, 46 closed. This is advantageous in that it prevents the polyurethane from back filing through the conduits and into the hub 8 during the moulding process. It also provides anchorage for the moulded tyre 4, described further herein under.

For the ease of illustration, the finished tyre 4 is shown separate from the wheel with tyre 2 in FIG. 8. However, it is firmly anchored to the wheel 10 as best illustrated in FIGS. 3 and 4. Unlike a conventional solid tyre 4, this tyre 4 is formed about the first and second bands 12 and 14 and thereby has a hollow interior 50. The hollow interior 50 is provided between the first and second bands 12 and 14 and the overlying hub cap portions 54 which extend between the bands 12, 14. By this means a mere skin of polyurethane 52 encapsulates the bands 12, 14 and the portion 54 of each hub cap. This mere skin provides the tyre 4. The tyre 4 seals this end of the hub cap 54 to the wheel 10 to prevent the ingress of water and dirt into the interior of the wheel 10. Furthermore the tyre material has solidified in the channels 34, this is shown as item 36a in FIG. 8. This enables each end of the tyre to be anchored between the channels each side of the wheel. The bores 42 in the base of the channels which connects the opposite channels 34 together also contain solidified material to further increase the anchorage between the two channels 34, and to provide a complete circle of anchored tyre around the bands 12, 14. Finally the solidified material in the conduits 36 is solidified and connected to the material in the channels 34 to provide further anchorage points for the tyre 4.

Since the tyre 4 and wheel 10 are of polyurethane and a polyolefin respectively, which do not adhere well to each other, and since the rim may have no inner well, the various anchorage points provide an efficient way of attaching the tyre to the wheel.

The tyre encapsulates the combination of the first and second bands 12, 14 and the portion of the hub cap 54 extending therebetween. Between the bands 12 and 14 and the overlaying hub cap 54 there is hollow 50 provided inside the tyre which contain the support webs 18. The webs extend between the two bands 12 and 14, they are resiliently mounted and extend at an inclined angle to the radial direction of the wheel, such that when the wheel contacts the ground they can deflect. They are made from a high impact grade of plastics in order that they do not exceed their elastic limit when under load and can return to their rest state when the load is removed. The properties of the material selected can be chosen to suit the requirements of its end use, the properties include, but is not limited to the material chosen, the shape of the webs (adjusting thickness and depth) to change performance load, and the angle of their incline. These webs help provide shock-absorbency, providing a smoother ride and improved durability of the competed wheel with tyre.

The hub cap together with the tyre completely encapsulates the wheel to prevent the ingress of dirt and moisture, which additionally increases the durability of the wheel with tyre. It also increases its possible end use, since the sealed structure is particularly adapted for use in a sterile environment, for example for use on a medical trolley.

The hub could also be sealed with a cap which provides a tight pressing fit into its central aperture. This could provide a carrier for bearing, bushes etc enabling its connection to an axle.

Since the wheel has no inner well region that must be filled by the tyre, less tyre material is needed to form the tyre. Also because of the hollow 50 within the tyre, the amount of tyre material, i.e. polyurethane is further reduced. In addition, since the tyre and wheel are not produced separately, a saving is made in inventory, assembly costs and transport.

The shock-absorbing capabilities of the wheel is further increased because the side wall of the tyre can be flexed under load. The side wall of the tyre lies over the faces of the wheel between the two bands 12, 14 and comprise the tyre material overlying the encapsulated part of the hub cap 54. To this end the hub cap 6 may be made of a more flexible material than that of the wheel 10. A suitable material would be polypropylene. This enables flexibility of the side wall of the tyre when under load, enabling a greater shock-absorbency and increasing the durability of the wheel with tyre.

Whilst the wheel has been described as being injection moulded from a polyolefin, it may be of any suitable plastic material, for example polyethylene, or other suitable materials, including steel. Whilst moulding has a single piece has been described for the wheel the various sections could be produced separately and fixed together.

Many variations are possible without departing from the scope of the invention.

The invention claimed is:

1. A method of manufacturing a combination wheel and tyre comprising the steps of providing a wheel and moulding a tyre to the wheel, placing a mould over the wheel such that a cavity is formed between an inner surface of the mould and a rim of the wheel, for receiving material to form the tyre, wherein the wheel is provided with an inlet which is fluidly connected by a conduit to an outlet in the rim of the wheel, and a material to form the tyre is injected into the inlet, and wherein a hub cap is provided and the method includes the additional steps of covering a face of the wheel with the hub cap prior to the step of placing the mould, and sealing the hub cap to the wheel during the moulding process.

2. The Method according to claim 1, wherein a second hub cap is placed such that there is one hubcap on each face of the wheel prior to the step of moulding.

3. The Method according to claim 1, wherein the hub cap extends to at least partially cover the rim.

4. The Method according to claim 1, wherein the hub cap has a plurality of apertures and the method includes the step of aligning the apertures with the outlet to fluidly connect the apertures with the outlet.

5. The Method according to claim 1, wherein the wheel comprises a hub and the inlet is located at the hub, the wheel being provided with a plurality of said inlets and outlets, the outlets being distributed around the rim of the wheel and each inlet being fluidly connected by a respective conduit to a respective outlet, wherein a pipe is fluidly connected to the hub and the material to form the tyre is injected into at least one inlet through the pipe, the method further including the step of rotating the wheel during the injection process.

6. The Method according to claim 1, wherein the conduit is open and the step of placing the hub cap includes the step of sealing the conduit with the hub cap.

7. A method of manufacturing a combination wheel and tyre comprising the steps of providing a wheel and moulding a tyre to the wheel, placing a mould over the wheel such that a cavity is formed between an inner surface of the mould and a rim of the wheel, for receiving material to form the tyre, wherein the wheel is provided with an inlet which is fluidly connected by a conduit to an outlet in the rim of the wheel, and a material to form the tyre is injected into the inlet, and wherein a hub cap is provided and the method includes the additional steps of covering a face of the wheel with the hub cap prior to the step of placing the mould, and sealing the hub cap to the wheel during the moulding process, wherein the hub cap has a plurality of apertures and the method includes the step of aligning the apertures with the outlet to fluidly connect the apertures with the outlet, and wherein the rim has a first open channel and the outlet opens into the first open channel, the step of placing the hub cap further including the step of covering the first open channel with the hub cap whilst aligning the apertures of the hub cap with the first open channel.

8. The Method according to claim 7, wherein a second open channel is provided in the rim which is fluidly connected to the first open channel.

9. The Method according to claim 7, wherein a second open channel is provided in the rim which is fluidly connected to the first open channel, and wherein the first and second open channels open to opposite faces of the wheel.

10. The Method according to claim 7, wherein the rim compromises two spaced concentric bands interconnected by a web between the bands, which bands extend around the circumference of the wheel, wherein the open channel is provided in at least one of the bands, the step of placing the hub cap further includes the step of sealing the web between the bands with the hub cap.

11. The Method according to claim 7, wherein the first open channel is in the innermost band and the method includes the step of introducing material to form the tyre into the inlet, flowing the material through the conduit into the open channel, flowing the material through the apertures into the mould's cavity and allowing the tyre to form in the cavity.

12. The Method according to claim 7, wherein the first open channel is in the innermost band, and wherein a second open channel is provided in the innermost band which is fluidly connected to the first open channel, and the method further includes the step of introducing material to form the tyre into the inlet, flowing the material through the conduit into the first open channel, flowing material from the first open channel to the second open channel and flowing the material through the hub cap apertures into the cavity and allowing the tyre to form in the cavity.

13. The Method according to claim 7 wherein the mould is placed over the wheel and extends around the circumference of the wheel encapsulating the rim, the cavity defining a shape of the tyre to be moulded about the rim, wherein the material to form the tyre is introduced into the mould in a liquid form and allowed to solidify in the mould, conduit, channel and apertures to form the tyre and anchor the formed tyre to the wheel.

14. A wheel with tyre according to claim 7, wherein a second hub cap is placed such that there is one hubcap on each face of the wheel prior to the step of moulding, each hub cap extending to at least partially cover the rim, and each hub cap having a plurality of said apertures and the method includes the step of aligning the apertures with the outlet to fluidly connect the apertures with the outlet.

15. The Method wherein the wheel has a rim and opposite faces, and the tyre is moulded about the rim by placing a mould over the wheel such that a cavity is formed between an inner surface of the mould and the rim of the wheel, the wheel having an inlet which is fluidly connected by a conduit to an outlet in the rim, whereby material to form the tyre is injected into the inlet, the wheel with tyre further having a hub cap sealed to a face of the wheel by the moulded tyre during the moulding of the tyre, and wherein the tyre has a substantially hollow interior.

16. The Wheel with tyre according to claim 15, wherein the hollow interior comprises a flexible web.

17. The Wheel with tyre according to claim 15, wherein the hollow interior comprises a flexible web which comprises two concentric, spaced bands extending around the wheel with the web extending between the bands.

18. The Wheel with tyre according to claim 15, wherein the hollow interior comprises a flexible web which comprises two concentric spaced bands extending around the wheel and with the web extending between the bands, and wherein the hub cap seals the web completely between the bands.

19. The Wheel with tyre according to claim 15, wherein a second hub cap is sealed such that there is one hubcap on each face of the wheel.

20. The Wheel with tyre according to claim 15, wherein the wheel has a hub, and the hub cap has a hub cap aperture and means to seal about the hub.

\* \* \* \* \*

UNITED STATES PATENT AND TRADEMARK OFFICE
CERTIFICATE OF CORRECTION

PATENT NO. : 10,052,832 B2
APPLICATION NO. : 15/021586
DATED : August 21, 2018
INVENTOR(S) : Michael Andrews and Paul Andrews It is certified that error appears in the above-identified patent and that said Letters Patent is hereby corrected as shown below:

In the Claims

Column 8, Claim 14, Line 36, "A wheel with tyre according to claim 7" should read
--The Method according to claim 7--

Column 8, Claim 15, Line 43, "The Method wherein the wheel has a rim" should read
--A wheel with tyre wherein the wheel has a rim--

Page 1 of 1

Signed and Sealed this
Sixth Day of November, 2018

Andrei Iancu
*Director of the United States Patent and Trademark Office*